Dec. 13, 1938.  W. B. THIEMAN  2,139,868
ENSILAGE HARVESTER
Filed May 20, 1936
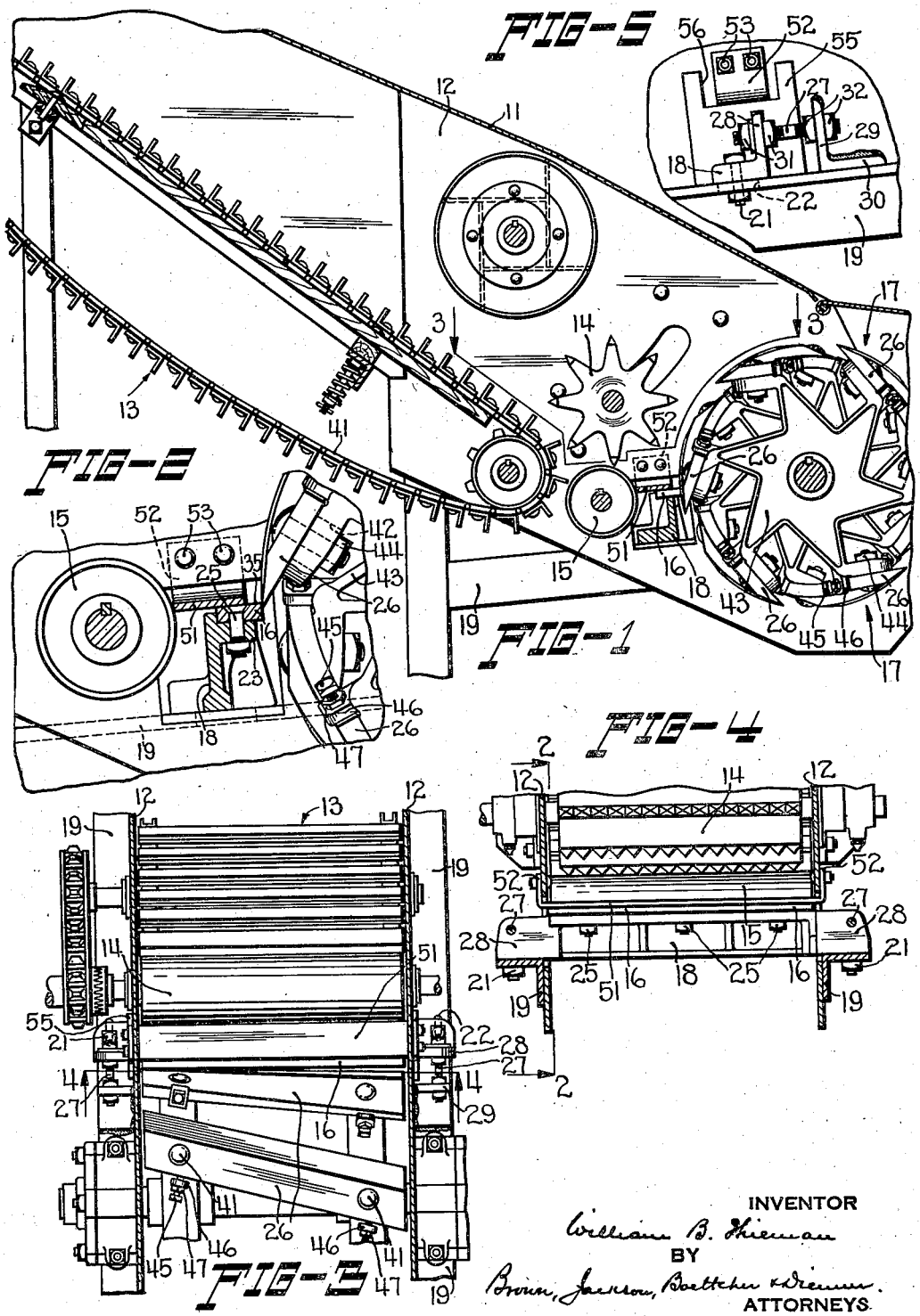
INVENTOR
William B. Thieman
BY
Brown, Jackson, Boettcher & Dienner
ATTORNEYS Patented Dec. 13, 1938

2,139,868

UNITED STATES PATENT OFFICE 2,139,868

ENSILAGE HARVESTER

William B. Thieman, Albert City, Iowa, assignor to Deere & Company, Moline, Ill., a corporation of Illinois Application May 20, 1936, Serial No. 80,699

5 Claims. (Cl. 146—120)

The present invention relates to improvements in ensilage cutters, preferably but not necessarily of the type employed in ensilage harvesters, which are designed to harvest standing corn or other crops in the field and to cut the same into small pieces.

An ensilage harvester of this general type is fully illustrated and described in the copending application of Ellsworth T. Johnson, Serial No. 76,035, filed April 23, 1936, and while the present invention contemplates certain improvements in the cutting mechanism by which the corn or other crop harvested is cut up into pieces of the proper length, called ensilage, and used for cattle feeding, the broader aspects of the present invention are equally applicable to ensilage cutters that are not parts of harvesters. Therefore, as the instant application has particularly to do with the cutting mechanism, only such parts of the entire harvester as are necessary to an understanding of the present invention have been illustrated in the accompanying drawing and will be hereinafter described, and reference may be had to the above mentioned Johnson application for a showing and description of the entire harvester if such is desired.

The cutting mechanism heretofore used in harvesters of this type ordinarily comprised a rotary cutter provided with a plurality of cutting knives or blades which cooperate with a fixedly mounted stationary knife or blade to perform the cutting operation. The conventional rotary cutter employs six cutting blades which are removably mounted on the supporting means whereby they may be removed for regrinding the cutting edges of the blades when necessary. In harvesters of this type, after the harvester has been operated for a few hours the cutting edges of the rotary cutter blades become worn and somewhat rounded, therefore making it necessary to stop the harvesting operation and remove the blades in order to regrind them. After regrinding, the blades must be remounted on their supporting heads and each blade must be adjusted independently to place it in the proper position relative to the stationary knife in order that the cutting mechanism will operate properly. This removal, sharpening and remounting of the blades in proper operating position on their supporting heads necessarily requires considerable time and labor, which, of course, is disadvantageous.

With the above in view, it is the principal object of the present invention to adjustably support the stationary knife or blade on the frame of the harvester whereby it is possible not only to properly position the stationary knife with respect to the rotary cutter initially and after each grinding of the rotary cutter blades, but also to adjust the position of such stationary blade so that it will serve to dress off the cutting edges of the rotary cutter blades when they become slightly worn, whereby frequent regrinding is made unnecessary.

Another object of the invention is to provide a stripper plate for closing the opening which occurs between the lower feed roller and the stationary knife when such knife is adjusted forwardly or away from the feed roller and toward the rotary cutter, to thereby prevent stalks from becoming lodged in such opening.

Other objects and advantageous features will be apparent from the following description of the preferred embodiment of my invention taken in connection with the accompanying drawing, in which:

Figure 1 is a fragmentary vertical sectional view of a portion of a harvester and showing my improved cutting mechanism incorporated therein;

Figure 2 is an enlarged fragmentary vertical sectional view taken substantially on the plane of the line 2—2 of Figure 4 and showing the means for supporting the stationary knife of the cutting mechanism and the stripper plate in position;

Figure 3 is a longitudinal horizontal sectional view taken substantially on the plane of the line 3—3 of Figure 1 and showing the relative positions of the stripper plate, stationary knife and rotary cutter blades;

Figure 4 is a vertical transverse sectional view taken substantially on the plane of the line 4—4 of Figure 3 and showing the means for mounting the stationary knife bed and the stripper plate on the side walls of the housing; and Figure 5 is an enlarged fragmentary end view showing the means for adjusting the stationary knife.

Referring to the several figures of the drawing, the cutting mechanism of the present invention and the means for feeding the harvested stalks to such cutting mechanism is supported within a suitable hopper or feeder house, the top wall of which is indicated by 11, and the side walls thereof by 12. This feeder house is disposed transversely of the harvester adjacent the rear end thereof, as fully illustrated and described in the above mentioned Ellsworth T. Johnson application. As is also explained in said Johnson application, the harvested material is delivered to the upper end of an endless feed conveyor indicated at 13, which conveys the material and delivers it between upper and lower feed rollers 14 and 15, respectively, which in turn delivers the material to the cutting mechanism comprising a stationary blade or knife 16 and a rotary cutter indicated as a whole by the numeral 17.

In the present construction, the stationary knife 16 is supported on a suitable knife bed 18 which is disposed transversely of the feeder house and has its opposite ends projecting outwardly through suitable openings provided therefor in the opposite side walls 12 of the feeder house. The knife bed 18 is in the form of a suitable casting which is substantially Z-shaped in cross-section (Figure 2), and each end thereof is adjustably secured to the adjacent supporting frame member 19 of the feeder house by a bolt 21 (Figure 5) which extends through a hole provided therefor in the base member or rearwardly extending leg of the bed and through a slot 22, shown in dotted lines in Figures 2 and 5, provided in the supporting frame member 19 in alignment with the hole in the adjacent end of the bed. The stationary knife or blade 16 above mentioned is supported on the upper or forwardly extending leg 23 of the Z-shaped knife bed 18 and is detachably secured thereto by a plurality of bolts 25 (Figure 4), or in any other suitable manner.

As will be readily understood, the stationary knife bed 18 may be adjusted to any position within the limits of the slots 22 in order to bring the cutting edge of the blade 16 closely adjacent to or into engagement with the cutting edges of the several blades 26 of the rotary cutter. To facilitate this adjustment and to securely hold the stationary knife or blade 16 in the proper position when so adjusted, an adjusting bolt 27 is provided at each end of the bed 18. This bolt 27 extends through a hole in a vertical flange 28 formed integral with the bed 18 at each end thereof (Figure 5), and through a hole in a similar vertical flange 29 of an angle iron frame member 30 in alignment with the hole in the flange 28, the angle iron member 30 being fixed to its adjacent frame member 19 as by welding or in any other suitable manner. The bed 18 is locked in its various adjusted settings by means of a pair of lock nuts 31, one of which is threaded on the bolt 27 at each side of the flange 28, and a second pair of lock nuts 32, one of which is threaded on the bolt at each side of the flange 29, as shown in Figures 3 and 5.

After the harvester has been operating for a period of time, the cutting edges of the several blades of the rotary cutter may become slightly worn and assume a rounded shape, and in order to renew such cutting edges, according to the present invention, it is necessary only to adjust the knife bed 18 slightly forwardly so that the stationary blade 16 carried thereby engages the cutting edge of each of the blades 26 of the rotary cutter. It has been found in practice that about one-sixth of a complete turn on the lock nuts 31 is sufficient, and when the blade 16 is thus adjusted and the rotary cutter is then operated, the portion 35 of the stationary knife blade 16 (see Figure 2) dresses off the cutting edges or tips of the several blades 26 to thereby renew such cutting edges. The cutting mechanism will thereafter again function properly for another period, and this operation of adjusting the stationary blade toward the blades of the rotary cutter can be repeated several times before it becomes necessary to remove the blades 26 from their supporting heads and regrind them. After regrinding of the blades of the rotary cutter the stationary knife 16 can readily be adjusted forward to proper position relative to the rotary cutter blades as has been described.

Each of the several blades or knives 26 of the rotary cutter 17 is detachably connected to its supporting head whereby it may be readily removed for regrinding, and it is also supported thereon for adjustment relative thereto whereby each knife 26 may be separately adjusted on the rotary cutter relative to the stationary knife 16 after each grinding operation. This means comprises a pair of bolts 41, one adjacent each end of the blade as shown in Figure 3. Each of the bolts 41 extends through a hole in the blade and through a slot 42 provided therefor in the blade supporting head 43 in alignment with said hole. A nut 44 threaded on the end of the bolt below the slot 42 clamps the several parts securely together. As will be appreciated, the knife 26 is adjustable relatively to its supporting head within the limits of the slots 42, and in order to provide for fine adjustments of the blades of the rotary cutter, an adjusting bolt 45 is provided adjacent the opposite end of each of said blades. These adjusting screws are threaded through a vertically extending flange 46 (Figures 2 and 3) formed integral with or suitably secured to the head 43. The ends of said adjusting bolts abut against the rear edges of the blades, and the blades are adjusted by turning the bolts before the nuts 44 on the locking bolts 41 are tightened, as will be readily understood. The adjusting bolts 45 are each held in adjusted position by a locking nut 47. This adjusting means for the rotary cutter blades is old in the art and forms no part of the present invention.

By adjusting the stationary knife 16 forwardly or toward the rotary cutter, an opening is presented between the stationary knife and the lower feed roller 15, and this opening is increased with each forward adjustment of the knife 16. It will be apparent, therefore, that as such opening increases in width stalks are apt to become lodged in such opening during the operation of the machine, which would probably result in clogging of the machine and necessitate the labor of cleaning out such lodged material. In order to prevent the lodging of the stalks in such opening, I provide what may be termed a stripper plate 51 which is so mounted as to lie over the opening and prevents the admission of stalks thereinto. This stripper plate 51 extends transversely of the feeder house (Figure 3) and has its outer ends projecting through suitable openings provided therefor in the opposite side walls 12 of the feeder house. The outer ends of said stripper plate are bent upwardly, as shown at 52, so as to lie adjacent the outer surfaces of said side walls (Figure 4), and such upwardly bent ends are each secured to its adjacent side wall of the feeder house by a pair of bolts 53 as shown in Figures 2 and 5. The rear edge of the stripper plate 51 engages the outer periphery of the lower feed roller 15, as best shown in Figure 2, and acts to strip the material off of the roller as the material is being fed by the feed rollers into the cutting mechanism. The underside of the stripper plate 51 bears upon the upper surface of the stationary knife 16. It will thus be seen that the stripper plate 51 completely covers the opening between the lower feed roller and the rear edge of the stationary knife, and the stripper plate is of such width that it always covers such opening in the movement of the knife bed 18 within the limits of the slots 22.

The opening in the opposite side walls 12 of the feeder house through which the opposite ends of the knife bed 18 project are of sufficient size to permit the knife bed to be adjusted within the limits of the slots 22 in the frame members 19, and a suitable cover member or plate 55 is provided on the knife bed 18 adjacent each end thereof and lies flush against the outer surface of the adjacent side wall of the housing and on the inner side of the adjusting bolt 27 (see Figures 3 and 5). This cover plate is movable with the knife bed and is of such width that it completely closes the portion of the opening in the side wall of the feeder house that is not occupied by the ends of the knife bed, as best shown in Figure 5. The cover plate 55 is provided with a cut out portion 56 at its upper portion (Figure 5) to accommodate the upturned end 52 of the stripper plate 51, and such cut out portion is of such width as to accommodate the end of the stripper plate regardless of the position of the cover plate in the adjustment of the stationary knife bed.

I claim:

1. An ensilage cutter including a housing having side walls, a rotary cutter in said housing having a plurality of blades, a stationary blade cooperating with said rotary cutter blades, a feed roller in said housing for feeding material to said cutting mechanism, a bed supporting said stationary blade, means for adjusting said bed to move said stationary blade toward said rotary cutter blades, and a stripper plate closing the opening between said stationary blade and the feed roller against the entry of material thereinto, the stripper plate having its outer ends extending through openings in the side walls of the housing and turned upwardly and secured to the adjacent sides of the latter.

2. An ensilage cutter including a housing having side walls, a rotary cutter in said housing having a plurality of blades, a stationary blade cooperating with said rotary cutter blades, a bed for supporting said stationary blade, the ends of the bed extending through openings in the side walls of the housing, means for adjusting said bed longitudinally to move said stationary blade toward said rotary cutter blades, a cover plate carried by each end of said bed for closing the openings in the side walls of the housing, a feed roller in said housing for feeding material to said cutting mechanism, and a stripper plate closing the opening between said stationary blade and the feed roller with its outer ends extending through the openings in the side walls of the housing and secured to the outer sides thereof, said cover plates being cut away adjacent the ends of the stripper plate to provide for movement of said cover plates relative to said stripper plate.

3. A harvester including a housing having side walls, cutting mechanism in said housing comprising a rotary cutter having a plurality of blades and a stationary blade cooperating with said rotary cutter blades, a bed for supporting said stationary blade, the ends of the bed extending through openings in the side walls of the housing, means for adjusting said bed longitudinally to move said stationary blade toward said rotary cutter blades, a cover plate carried by each end of said bed for closing the openings in the side walls of the housing, a pair of feed rollers in said housing for feeding material to said cutting mechanism, conveyor means for delivering stalks to said feed rollers, and a stripper plate closing the opening between said stationary blade and the lower of said feed rollers with its outer ends extending through the openings in the side walls of the housing and secured to the outer sides thereof.

4. An ensilage cutter including a housing having side walls, a rotary cutter in said housing having a plurality of blades, a stationary blade cooperating with said rotary cutter blades, a feed roller in said housing for feeding material to said cutting mechanism, a bed supporting said stationary blade, means for adjusting said bed to move said stationary blade toward said rotary cutter blades, and a stripper plate closing the opening between said stationary blade and the feed roller against the entry of material thereinto, the stripper plate having its outer ends turned at right angles and secured to the side walls of the housing, respectively, said turned ends being disposed outwardly of the planes of the inner surfaces of said side walls to avoid interference with material being fed to the cutter.

5. An ensilage cutter including a housing having side walls, a rotary cutter in said housing having a plurality of blades, a stationary blade cooperating with said rotary cutter blades, a feed roller in said housing for feeding material to said cutting mechanism, a bed supporting said stationary blade, means for adjusting said bed to move said stationary blade toward said rotary cutter blades, and a stripper plate closing the opening between said stationary blade and the feed roller against the entry of material thereinto, the stripper plate having its outer ends turned upwardly and secured to the housing, the inner surfaces of said turned ends being spaced apart a distance at least equal to the distance between the inner surfaces of the side walls of the housing adjacent thereto, and positioned with respect to said side walls to avoid interference with material being fed to the cutter.

WILLIAM B. THIEMAN.